(12) United States Patent
Taniwaki et al.

(10) Patent No.: US 8,790,767 B2
(45) Date of Patent: Jul. 29, 2014

(54) RELEASE SHEET AND FORMED ARTICLE OBTAINED BY USING SUCH RELEASE SHEET

(75) Inventors: Fujio Taniwaki, Komatsushima (JP); Kenichi Fukumoto, Komatsushima (JP); Toshiharu Kanayama, Komatsushima (JP)

(73) Assignee: Lintec Corporation, Tokyo (JP)

( * ) Notice: Subject to any disclaimer, the term of this patent is extended or adjusted under 35 U.S.C. 154(b) by 1055 days.

(21) Appl. No.: 11/632,488

(22) PCT Filed: Jul. 11, 2005

(86) PCT No.: PCT/JP2005/013203
§ 371 (c)(1),
(2), (4) Date: Mar. 15, 2007

(87) PCT Pub. No.: WO2006/006713
PCT Pub. Date: Jan. 19, 2006

(65) Prior Publication Data
US 2007/0202301 A1      Aug. 30, 2007

(30) Foreign Application Priority Data
Jul. 13, 2004  (JP) ................. 2004-206556

(51) Int. Cl.
*B32B 3/00*      (2006.01)
(52) U.S. Cl.
USPC ........................................ 428/143; 428/151
(58) Field of Classification Search
USPC .......................................................... 428/143
See application file for complete search history.

(56) References Cited

U.S. PATENT DOCUMENTS

| 2,046,000 | A  | * | 6/1936 | Sart ............................... 428/151 |
| 6,057,041 | A  | * | 5/2000 | Sumi et al. ..................... 428/447 |
| 6,114,027 | A  | * | 9/2000 | Onishi et al. .................. 428/323 |
| 2002/0076500 | A1 | * | 6/2002 | Glassock ................... 427/407.1 |
| 2004/0062913 | A1 | * | 4/2004 | Suto et al. ..................... 428/141 |
| 2005/0089671 | A1 | * | 4/2005 | Kubota ......................... 428/143 |
| 2005/0211113 | A1 | * | 9/2005 | Caron et al. ..................... 101/32 |
| 2006/0003892 | A1 | * | 1/2006 | Ikemizu et al. ............... 503/227 |

FOREIGN PATENT DOCUMENTS

| JP | 10-742 A        | 1/1998 |
| JP | 11-156825 A     | 6/1999 |
| JP | 2003-127258 A   | 5/2003 |
| JP | 2004-115972 A   | 4/2004 |
| WO | WO 0064660 A1 * | 11/2000 |

OTHER PUBLICATIONS

Machine generated English language translation of JP-A-10-742, publication date Jan. 6, 1998, Applicant: Toyo Metallizing Co. Ltd.

* cited by examiner

*Primary Examiner* — Maria Veronica Ewald
*Assistant Examiner* — Laura Auer
(74) *Attorney, Agent, or Firm* — Sughrue Mion, PLLC

(57) ABSTRACT

The present invention relates to a release sheet which comprises a mat making layer forming a refined uneven of mat style on a surface, the mat making layer being provided on at least one surface of a substrate sheet, and a release layer formed with a coating film layer of releasable resin containing ultra micro particles having an average particle size of 0.01 to 0.3 µm, the release sheet being provided on a surface of the mat making layer. The release sheet of the present invention has superior heat resistance and mechanical strength for a long time, and can prevent change of mat style having low gloss of the surface or of gloss, even if repeat uses are conducted. By using the release sheet of the present invention, a formed article such as synthetic leathers and decorative laminated plates having uniformity quality, can be provided.

14 Claims, No Drawings

RELEASE SHEET AND FORMED ARTICLE OBTAINED BY USING SUCH RELEASE SHEET

TECHNICAL FIELD

The present invention relates to a release sheet and specifically a release sheet which can produce a formed article having a mat style surface of low gloss, and a formed article obtained by using the release sheet.

BACKGROUND ART

A release sheet is utilized as a release sheet used for producing various kinds of synthetic leather product such as synthetic leathers and semi synthetic leathers made of polyurethane resin, and synthetic leathers made of poly-vinyl chloride resin and a decorative laminated plate and the like, wherein the release sheet can be called as a process sheet, and a protect sheet of an adhesive layer of adhesive product.

Conventionally, release sheets prepared by laminating a polyolefin resin such as polypropylene resins and polymethylpenten resins on the surface of a substrate sheet, and forming a release layer, and release sheets prepared by forming a release layer by coating an alkyd resin on the substrate sheet and by providing an emboss processing on the release layer with a emboss roll having a refined uneven on the surface, have been known as the release sheet.

Various kinds of synthetic leather product, decorative laminated plate and the like are produced by extruding a polyurethane resin composition, a poly-vinyl chloride resin composition or the like on the surface of the release layer of these release sheets, transferring an embossing pattern of the surface of the release sheet on the surface of the extruded product, and then peeling off release sheet from the extruded product.

Additionally, as a release sheet used for forming mat style uniformly on the surface of the synthetic leather, a release sheet prepared by forming a release graduated layer on one surface of a substrate paper, by coating an applying liquid of resin composition in which an inorganic and/or organic micro particle are dispersed uniformly in the releasable resin, to form a release layer having refined uneven that an arithmetical mean surface roughness of the surface is 0.5 to 15 μm, has been proposed (Japanese Patent Laid-Open No. 2002-361815).

However, the conventional above-described release sheets are enough to form a mirror style having high gloss on the surface of the formed article obtained by using the release sheet, but are insufficient to form a mat style having low gloss.

When the mat style having low gloss is provided on the surface of the formed article, it is necessary to form a refined and deep uneven uniformly for a large area. But, for making such embossing roll, it was difficult technically.

Additionally, there has been proposed to form a refined uneven of mat style having low gloss on the release layer of the release sheet by coating method instead of the embossing method as described above. However, in this method, it is good to control the gloss, but durability of repeat uses is inferior, uniformity of the film surface is weak, and yield is low, and therefore there is a problem in industrial production. Accordingly, it was not satisfied.

DISCLOSURE OF THE INVENTION

An object of the present invention is to provide, a release sheet having superior heat resistance and mechanical strength for a long time, and having no change in mat style having low gloss of the surface and in gloss, even if repeat uses are conducted, and further a formed article such as a synthetic leather and a decorative laminated plate having homogeneous quality, obtained by using the release sheet.

The present inventors have perfected the present invention by discovering, as a result of a diligent study carried out to solve the above-described problems, that the above-described problems can be solved by synergetic effect of a mat making layer and a release layer, the mat making layer being formed by providing mat making layer having a refined uneven surface of mat style between a substrate sheet and a release layer, and the release layer being formed with a coating film layer of releasable resin containing organic or inorganic ultra micro particles.

Thus, the present invention provides a release sheet, which comprises a mat making layer forming a refined uneven of mat style on a surface, the mat making layer being provided on at least one surface of a substrate sheet and a release layer formed with a coating film layer of releasable resin containing ultra micro particles having an average particle size of 0.01 to 0.3 μm, the release sheet being provided on a surface of the mat making layer.

Additionally, the present invention provides the release sheet as described above, wherein the mat making layer is formed with a coating film layer containing micro particles having an average particle size of 0.5 to 30 μm.

Also, the present invention provides the release sheet as described above, wherein the ultra micro particles contained in the release layer is silica ultra micro particles.

Further, the present invention provides the release sheet as described above, wherein a glossiness of the surface of the release layer is 1.5 to 2.5%.

Furthermore, the present invention provide a resin formed article having a surface of mat style, which is obtained by forming a resin composition layer on a surface of the release layer of any one of the release sheet as described above, curing and then peeling off from the release sheet.

The release sheet of the present invention has superior heat resistance and mechanical strength for a long time, and can prevent change of mat style having low gloss of the surface or of gloss, even if repeat uses are conducted. Additionally, by using the release sheet of the present invention, a formed article such as synthetic leathers and decorative laminated plates having uniform quality of mat style having low gloss can be provided.

PREFERRED EMBODIMENTS FOR CARRYING OUT THE INVENTION

The substrate sheet in the release sheet of the present invention includes paper sheets such as fine quality paper, clay coated paper, and cast coated paper; and synthetic resin sheets of polyolefin resin such as polyethylene resin, and polyester resin; polyester resin such as polybutylene terephthalate resin, polyethylene terephthalate resin, and polyethylene naphthalate resin; polyether imide resin; acetate resin; polystyrene resin; vinyl chloride resin and the like.

The substrate sheet may be formed in either a single layer or multiple layers having two or more layers of the same type or different types. No particular constraint is imposed on the thickness of substrate sheet, but the thickness may usually be 10 to 300 μm, and is preferably 20 to 200 μm.

When the paper sheet is used as the substrate sheet, before forming the mat making layer, it is preferable to form a filler layer on the surface of the paper sheet. No particular constraint is imposed on the filler layer, as long as the filler layer is consisting of a component having filler function, a composition made of a binder and an inorganic filler is preferable. Examples of the binder include natural rubbers, butadiene rubbers, styrene-butadiene rubbers, chloroprene rubbers, isoprene rubbers, acrylonitrile-butadiene rubbers, ethylene-propylene rubbers, ethylene-vinyl acetate rubbers, acrylic rubbers, urethane rubbers, polyester resins, and acrylic resins. The inorganic filler includes kaolin clay, baked clay, betonite, talc, serious earth, gypsum, barium sulfate, and aluminium silicate. No particular constraint is imposed on the mixing amount of the inorganic filler, as long as the filler function is exerted, usually it is preferably 50 to 98% by mass of the total amount of the composition of the filler layer. The glossiness of the surface for the filler layer is preferably 5% or more, is more preferably 8% or more, and is most preferably 10% or more.

And, no particular constraint is imposed on the upper limitation of glossiness, if the glossiness is too high, the adhesion strength of the mat making layer may be weak. Therefore, it is preferably not more than 40%, more preferably not more than 20%, most preferably not more than 15%.

The formation of the filler layer on one or both surface of the substrate, can be conducted by preparing the liquid composition for filler layer by diluting a component having filler function with a dispersion medium or a solvent, applying the composition on one or both surface of the substrate, and drying. The dispersion medium or the solvent includes water and organic solvents such as toluene, ethyl acetate and methyl ethyl ketone.

No particular constraint is imposed on the thickness of the filler layer, usually as coating amount after drying, it is preferably 1 to 30 $g/m^2$, is more preferably 2 to 20 $g/m^2$, is most preferably 3 to 15 $g/m^2$.

As examples of coating methods, gravure coat method, bar coat method, spray coat method, spin coat method, air knife coat method, roll coat method, braid coat method, gate roll coat method, die coat method and the like can be used. Additionally, as examples of drying method, for example, heat drying method in heat air drying oven and the like can be used.

No particular constraint is imposed on the drying temperature, but it is preferably 100 to 200° C., drying time is preferably 10 seconds to 5 minutes. The mat making layer has a function for giving refined uneven of mat style on the surface of the release layer formed on the surface of mat making layer. The refined uneven of mat style is formed on the surface of the mat making layer. The surface of mat style of the mat making layer has preferably a glossiness of 1.5 to 8%. Additionally, the surface of the mat style has preferably an arithmetical mean surface roughness of 5 to 30 μm, and most preferably 10 to 20 μm.

The mat making layer is composed of a resin and a mat making agent. The resin includes all kind of resin which can form a membrane, such as acrylic resin, polyolefin resin, polyester resin, polyvinyl alcohol resin and polystyrene resin.

The mat making agent is insoluble to the membrane forming resin included in the mat making layer, dispersion medium and solvent. The mat making agent can form the refined uneven on the surface of the mat making layer.

Examples of mat making agent includes micro particles such as inorganic micro particles, and organic micro particles. The inorganic micro particles include micro particles such as silica, calcium carbonate, talc, kaolin, titanium oxide, zinc oxide, alumina, magnesium hydroxide, aluminium hydroxide. Further, the organic micro particle includes micro particles such as starch, bridge starch, melamine resin, nylon resin, polystyrene resin, polypropylene resin, and acrylic resin.

No particular constraint is imposed on the average particle size of the mat making agent, but usually, the average particle size is preferably 0.5 to 30 μm, more preferably 1 to 20 μm, and most preferably 2 to 10 μm. The mat making agent can be used singly or in combination of two or more thereof.

According to a level of the refined uneven shape on the surface of the mat making layer, formulating amount of mat making agent can be appropriately selected, and can be selected as the glossiness of the surface is preferably 1.5 to 8%. Usually, it is preferably 30 to 70% by mass to total amount of the resin and the mat making agent.

In the mat making layer, the other additives can be appropriately formulated. The other additives include dispersant, leveling agent, antioxidant, ultraviolet ray absorbent, defoaming agent, dye, and pigment.

No particular constraint is imposed on the thickness of the mat making layer. Usually, as coating amount after drying, it is preferably 1 to 30 $g/m^2$, more preferably 2 to 20 $g/m^2$, and most preferably 3 to 15 $g/m^2$.

The mat making layer can be formed on one or both surface of substrate.

The formation of the mat making layer on one or both surface of the substrate can be conducted by preparing a liquid composition for the mat making layer obtained by diluting the resin and the agent with dispersant or solvent, by applying the liquid composition on one or two surface of the substrate, and by drying.

The dispersant or the solvent includes water and organic solvents as described above.

No particular constraint is imposed on the content of the dispersant or the solvent, usually it is preferably 50 to 95% by mass based on the total of the liquid composition for the mat making layer.

Further, as the coating method, the same methods as the coating methods of the filler layer as described above can be used.

Also, no particular constraint is imposed on the drying temperature, but the drying temperature is preferably 100 to 200° C., and drying time is preferably 10 seconds to 5 minutes.

The release layer can be formed by applying the composition for release layer on refined uneven of mat style of the surface of the mat making layer. As the release layer is applied thin on the surface of the mat making layer, the surface of the release layer can have almost the same shape as refined uneven of mat style on the surface of layer. And further, by inorganic or organic ultra micro particle contained in the release layer, more refined uneven can be formed. Glossiness of the surface of the release layer is preferably 1.5 to 2.7%, more preferably 1.5 to 2.6%, and most preferably 1.5 to 2.5%. Additionally, the surface of the mat making layer has arithmetical mean surface roughness of preferably 5 to 30 μm, and most preferably 10 to 20 μm.

The release layer contains a releasable resin and a ultra micro particle having an average particle size of 0.01 to 0.3 μm.

The release layer includes thermosetting or radiation-curing resins such as silicone resin, alkyd resin, melamine resin like methoxy methylol melamine resin, and acrylic resin. The silicone resin is preferable, and an addition type silicone resin is most preferable.

The ultra micro particle having an average particle size of 0.01 to 0.3 µm is not soluble to the releasable resin, dispersion medium, or solvent, and can form the refined uneven on the surface of the release layer.

The ultra micro particle having an average particle size of 0.01 to 0.3 µm includes inorganic or organic ultra micro particles having an average particle size of 0.01 to 0.3 µm. As inorganic or organic micro particle, the ultra micro particles composed of the material described above as the mat making agent can be used.

Average particle size of the ultra micro particle is 0.01 to 0.3 µm, preferably 0.01 to 0.1 µm, and most preferably 0.01 to 0.05 µm.

The ultra micro particle may use singly or in combination of two or more thereof.

According to the level of the refined uneven shape on the surface of release layer, formulating amount of ultra micro particle having an average particle size of 0.01 to 0.3 µm can be appropriately selected, but usually, it is preferably 10 to 70% by mass, and most preferably 20 to 50% by mass to the total amount of ultra micro particle having an average particle size of 0.01 to 0.3 µm.

In the release layer, the other additives may be appropriately formulated. The other additives include catalyst, leveling agent, surface active agent, dye, and dispersant. The catalyst is a material for promoting the curing of the resin, and usually, formulating amount of catalyst is preferably 0.5 to 3% by mass to 100 parts by mass of the resin.

The formation of the release layer on the surface of the mat making layer, can be conducted by preparing the liquid composition for the release layer obtained by diluting the releasable resin and the inorganic or organic ultra micro particle with a dispersant or a solvent, by applying the liquid composition on the surface of mat making layer, and by drying.

No particular constraint is imposed on the thickness of the release layer, but usually as coating amount after drying, it is preferably 0.1 to 15 g/m$^2$, more preferably 0.5 to 10 g/m$^2$, and most preferably 1 to 5 g/m$^2$. If the coating amount of the release layer is less than 0.1 g/m$^2$, there is a case that the release property is unstable. On the other hand, if the coating amount of the release layer is more than 15 g/m$^2$, the surface of the release layer in the state that release sheet was winded in roll form is easily blocked with the back surface of release sheet, and therefore there is a case that the release property of the surface of the release layer is decreased by blocking.

The formation of the release layer, can be conducted by applying the liquid composition for the release layer composed of the releasable resin, the inorganic or organic ultra micro particle and dispersant or solvent on one or two surface of the mat making layer, drying, and curing.

As the coating method, the same methods as coating method of filler layer described above can be used.

Additionally, as the drying method, a heat drying method in heat air drying oven and the like can be used. No particular constraint is imposed on the drying temperature, but it is preferably 100 to 200° C., and drying time is preferably 10 seconds to 5 minutes.

The dispersant or solvent include aromatic hydrocarbons such as toluene and xylene; aliphatic hydrocarbons such as hexane, heptane and octane; ketones such as dimethyl ketone, methyl ethyl ketone, diethyl ketone and cyclo hexanone. The dispersant or solvent can be used singly or in mixture of two or more thereof.

The amount of dispersant or solvent can be appropriately selected to control a viscosity in the suitable range, the solid component of the liquid composition for the release layer is preferably 10 to 50% by mass, and most preferably 20 to 40% by mass.

The release strength of the release layer of the release sheet of the present invention is preferably 50 to 300 mN/3 cm by the measuring method described in Examples.

The method for producing formed articles such as synthetic leathers, and decorative laminated plate by using the release sheet of the present invention includes a conventional paste coating method by which, for example, a synthetic leather made of polyvinyl chloride resin is produced, and a dry method by which, for example, a synthetic leather made of polyurethane resin is produced.

For example, the formed article is obtained by forming a resin composition layer on the surface of release layer of the release sheet, and then curing, and subsequently peeling off from the release sheet.

For example, as an example of a synthetic leather production, a synthetic leather having the surface of mat style can be produced by applying a resin composition for skin layer of a synthetic leather, on the surface of release layer of the release sheet, heat drying, to form a coated film of the skin layer, and subsequently, laminating a foundation on the coated film using an adhesive, drying, maturing, and then peeling off the release sheet. And a decorative laminated plate can be produced, in the same method.

EXAMPLES

In the following, the present invention is explained in more detail by Examples. Further, the present invention is not limited at all by these Examples.

Rating evaluations of release sheet obtained in Examples or Comparative Examples of the present invention were conducted by the following methods.

(1) Glossiness

By using gloss meter (trade name: GM-26D type, manufactured by Murakami Color Technology Research Co., Ltd.), glossiness of the mat making layer and the release layer at angle of 75° were measured.

(2) Initial Release Strength

On the surface of the release layer of the release sheet, one liquid type polyurethane resin solution (trade name: Chrisbon 5516S, manufactured by Dai Nippon Ink Industry Co., Ltd.) was applied, to form the film having a dried thickness of 20 µm, and dried at 130° C. for two minutes in heat air drying machine. And then the film was cut in a size of 20 cm×3 cm, and the release strength of the cut material was measured at 3 cm width pursuant to JIS Z0237.

(3) Surface Condition

Existence or no existence of cissing and existence or no existence of unevenness on the surface of the release layer of the release sheet were observed by visual. The surface conditions were evaluated on the basis of the following standers.

Good: There was no cissing and no unevenness.
Poor: There were cissing and unevenness.

(4) Repeat Release Test of Release Sheet

Gloss of the synthetic leather formed by using the release sheet first and gloss of the synthetic leather formed by using the release sheet five times were observed by visual.

Good: There was almost no change of gloss.
Poor: There was large change of gloss.

Example 1

Using a wood free paper (manufactured by Japan Paper Co., Ltd.) of 127 g/m$^2$ as a substrate sheet, on one surface of the substrate sheet, a liquid composition containing 100 parts by mass of kaolin clay, 10 parts by Xmass of styrene-butadiene rubber and 160 parts by mass of water were applied by air knife coater, in the coating amount after drying to be 12 g/m$^2$, and dried to form a filler layer. Glossiness of the surface of the filler layer was 13%.

On the surface of the filler layer, a liquid composition for a mat making layer composed of mixture of 10.5 parts by mass of polyvinyl alcohol resin (trade name: PVA-117, manufactured by Kurare Co., Ltd.), 10.0 parts by mass of mat making agent (trade name: Matutani Kikyou, manufactured by Matutani Chemical Industry Co., Ltd. Starch. average particle size of particle: 59 μm.), and 136.2 parts by mass of water were applied by air knife coater, in coating amount after drying to be 5 g/m$^2$, and dried at 160° C. for 30 seconds to form a mat making layer having refined uneven shape that the surface is mat style. Glossiness of the surface of the mat making layer was 2.0%, and arithmetical mean surface roughness was 15 μm.

Next, on the surface of the above-described mat making layer, a liquid composition for release layer composed of mixture of 100 parts by mass of addition type silicone resin (trade name: X-62-2791, manufactured by Shinetsu chemical Industry Co., Ltd.), 50 parts by mass of silica ultra micro particle powder (trade name: MEK-ST, manufactured by Nissan Chemical Industry Co., Ltd. average particle size: 0.03.), 1 parts by mass of catalyst (trade name: PL-50T, manufactured by Shinetsu Chemical Industry Co., Ltd.), and 350 parts by mass of solvent (mixture of toluene/methyl ethyl ketone (mass ratio 7/3)) were applied by bar coater, in coating amount after drying to be 2 g/m$^2$, and dried at 175° C. for 1 minute to form a release layer. Thus, a release sheet was prepared. The property evaluations of the obtained release sheet were conducted by the above-described test method. The results are shown in Table 1.

Example 2

A release sheet was prepared in the same manner as Example 1 expect that a liquid composition for mat making layer of a mixture of 12.0 parts by mass of SBR (trade name: 0614, manufactured by JSR Co., Ltd., styrene-butadiene rubber), 10.0 parts by mass of mat making agent (trade name: Matsutani kikyou, manufactured by Matsutani Chemical Industry Co., Ltd., Starch, Average particle size: 5 μm), 0.6 parts by mass of thickener (trade name: Alone A-7180, manufactured by Toa Synthesis Co., Ltd., methacrylic acid copolymer), and 146.6 parts by mass of water were applied by air knife coater, in coating amount after drying to be 5 g/m$^2$, and dried at 160° C. for 30 minutes to form a mat making layer having a refined uneven shape that the surface is mat style. Glossiness of the surface of the mat making layer was 7.0%, and arithmetical mean surface roughness was 15 μm. The property evaluations of the obtained release sheet were conducted by the above-described test method. The results are shown in Table 1.

TABLE 1

|  | Example 1 | Example 2 | Comp. Ex. 1 | Comp. Ex. 2 | Comp. Ex. 3 |
|---|---|---|---|---|---|
| Surface glossiness of release layer (%) | 1.9 | 2.5 | 2.6 | 2.1 | 2.6 |
| Arithmetical mean surface roughness of release layer (μm) | 15 | 15 | 15 | 15 | 20 |

TABLE 1-continued

|  | Example 1 | Example 2 | Comp. Ex. 1 | Comp. Ex. 2 | Comp. Ex. 3 |
|---|---|---|---|---|---|
| Initial release strength (mN/3 cm) | 150 | 150 | 150 | 150 | 180 |
| Surface condition | Good | Good | Poor | Poor | Poor (silica micro particle dropped out) |
| Change of gloss | Good | Good | Poor | Poor | Poor |

Comparative Example 1

A release sheet was prepared in the same method as in Example 1 expect that the release layer was formed directly on the clay coat paper without the formation of the mat making layer in Example 1. The property evaluations of the obtained release sheet were conducted by the above-described test method. The results are shown in Table 1.

Comparative Example 2

A release sheet was prepared in the same method as in Example 1 expect that the release layer was formed without containing the ultra micro particle in the release layer in Example 1. The property evaluations of the obtained release sheet were conducted by the above-described test method. The results are shown in Table 1.

Comparative Example 3

A release sheet was prepared in the same method as in Example 1 expect that a silica micro particle having an average particle size of 1 μm instead of silica ultra micro particle having an average particle size of 0.03 μm was contained in the release layer in Example 1. The property evaluations of the obtained release sheet were conducted by the above-described test method. The results are shown in Table 1.

Example 3

On the release layer surface of the release sheet obtained in Example 1, a polyvinyl chloride resin composition of paste style obtained by mixing 100 parts by mass of a polyvinyl chloride resin, 60 parts by mass of dioctyl phthalate as plasticizer, 5 parts by mass of a foaming agent, 3 parts by mass of a stabilizer, 10 parts by mass of carbon black as a colorant, was applied by knife coat method, in coating amount after drying to be 180 g/m$^2$, and dried at 190° C. for two minutes. And then, a foundation was laminated on the surface of the dried coated layer via an adhesive, dried, and matured. Subsequently, a synthetic leather made of polyvinyl chloride resin is produced by peeling off the release sheet. The synthetic leather made of polyvinyl chloride had a surface of superior mat style.

Further, by using the peeled release sheet, synthetic leathers made of polyvinyl chloride resin were repeatedly prepared four times by the above-described same operation. The release sheet was not broken, additionally, all of the synthetic leathers made of polyvinyl chloride resin produced in two to five times had surfaces of superior mat style.

Example 4

Synthetic leathers made of polyvinyl chloride resin were repeatedly prepared five times in the same method as in Example 3 except that the release sheet obtained in Example 2 was used instead of release sheet obtained in Example 1. The release sheet was not broken, additionally, all of the synthetic leathers made of polyvinyl chloride resin produced in one to five times had surfaces of superior mat making layer.

The release sheet of the present invention can be used as carrier sheets such as process sheets.

The invention claimed is:

1. A release sheet, which comprises a mat making layer which forms a refined uneven mat surface, the mat making layer being provided on at least one surface of a substrate sheet, and a release layer formed with a coating film layer of releasable resin containing 10 to 70% by mass of ultra micro particles having an average particle size of 0.01 to 0.05 μm, the release layer being provided on a surface of the mat making layer, wherein the mat making layer is provided between the substrate sheet and the release layer, and wherein the release layer is formed uniformly on all of the surface of the mat making layer,
  wherein the mat making layer is composed of a resin and a mat making agent and the arithmetical mean surface roughness of the surface of the mat making layer is 5 to 30 μm,
  wherein the formulating amount of mat making agent is 30 to 70% by mass to total amount of the resin and the mat making agent,
  wherein the mat making layer comprises at least one resin selected from the group consisting of a polyvinyl alcohol resin and a polystyrene resin,
  wherein a glossiness of the surface of the release layer is 1.5 to 2.5%,
  wherein the releasable resin contained in the release layer is at least one thermosetting or radiation-curing resin selected from the group consisting of a silicone resin, an alkyd resin, a melamine resin and an acrylic resin.

2. The release sheet as claimed in claim 1, wherein the mat making layer is formed with a coating film containing micro particles having an average particle size of 0.5 to 30 μm.

3. The release sheet as claimed in claim 1, wherein the ultra micro particles contained in the release layer is silica ultra micro particles.

4. The release sheet as claimed in claim 2, wherein the ultra micro particles contained in the release layer is silica ultra micro particles.

5. The release sheet as claimed in claim 1, wherein the mat making layer comprises micro particles which are starch micro particles having an average particle size of 0.5 to 30 μm.

6. The release sheet as claimed in claim 1, wherein the surface of the release layer has almost the same shape as the refined uneven mat style on the surface of the mat making layer and further, more refined unevenness formed by inorganic or organic ultra micro particles contained in the release layer, and the thickness of the release layer is 0.1 to 15 $g/m^2$ as coating amount after drying.

7. The release sheet as claimed in claim 6, wherein the thickness of the release layer is 1 to 5 $g/m^2$ as coating amount after drying.

8. The release sheet as claimed in claim 1, wherein the arithmetical mean surface roughness of the surface of the release layer is 5 to 30 μm.

9. The release sheet as claimed in claim 1, wherein the arithmetical mean surface roughness of the surface of the release layer is 10 to 20 μm.

10. The release sheet as claimed in claim 1, wherein the releasable resin contained in the release layer is only one resin selected from the group consisting of thermosetting resin and radiation-curing resins of a silicone resin, an alkyd resin, and a melamine resin.

11. The release sheet as claimed in claim 1, wherein the resin of the mat making layer is a polyvinyl alcohol resin.

12. The release sheet as claimed in claim 1, wherein the resin of the mat making layer is a polystyrene resin.

13. The release sheet as claimed in claim 1, wherein the releasable resin contained in the release layer is a silicone resin.

14. The release sheet as claimed in claim 1, wherein the mat making agent has an average particle size of 0.5 to 30 μm.

* * * * *